United States Patent [19]

Gene Esparza

[11] Patent Number: 4,546,439
[45] Date of Patent: Oct. 8, 1985

[54] METHOD AND APPARATUS FOR DETERMINING ROUTE FROM A PRESENT LOCATION TO A DESIRED DESTINATION IN A CITY

[76] Inventor: Natividad Gene Esparza, Bolivia, No. 15, Madrid, Spain

[21] Appl. No.: 470,132

[22] Filed: Feb. 28, 1983

[30] Foreign Application Priority Data

Mar. 10, 1982 [ES] Spain .................................. 510.299
Jun. 16, 1982 [ES] Spain .................................. 513.175

[51] Int. Cl.$^4$ ............................................ G06F 15/20
[52] U.S. Cl. .................................... 364/444; 340/995
[58] Field of Search ............... 364/424, 436, 443, 444, 364/449, 521; 353/11, 12; 340/988, 990, 995; 343/450–452; 73/178 R; 358/103

[56] References Cited

U.S. PATENT DOCUMENTS

| | | | |
|---|---|---|---|
| 4,312,577 | 1/1982 | Fitzgerald | 364/424 |
| 4,400,727 | 8/1983 | Aron | 358/103 |
| 4,437,085 | 3/1984 | Salant | 364/444 |
| 4,470,119 | 9/1984 | Hasebe et al. | 364/449 |
| 4,481,584 | 11/1984 | Holland | 364/436 |
| 4,484,192 | 11/1984 | Seitz et al. | 364/449 |

Primary Examiner—Gary Chin
Attorney, Agent, or Firm—Ostrolenk, Faber, Gerb & Soffen

[57] ABSTRACT

The present invention relates to a method and apparatus for enabling a traveler to determine the correct route from his present location to a desired destination in a city. To this end, the traveler enters information identifying his desired destination into an information station located at his present location. The information station compares the entered information with information identifying all the streets in the city and dividing the city into adjacent zones. As a result of the comparison, the information station determines the zone in which the desired destination is located. A map corresponding to the identified zone is then provided to the traveler. The map contains both the map of the streets in that zone and information on how to reach the zone from the present location. The traveler then proceeds to the desired destination, using boards arranged at street intersections. The boards contain information identifying each street corner and information concerning surrounding corners and may also include other data such as advertising.

14 Claims, 9 Drawing Figures

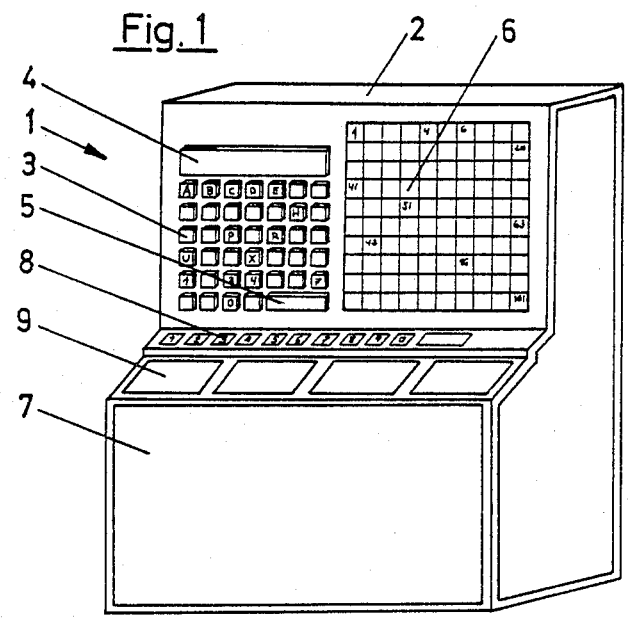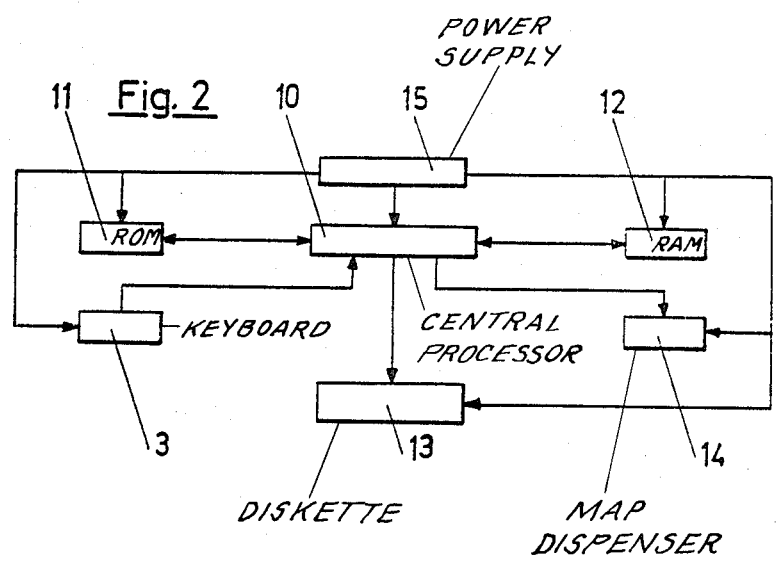

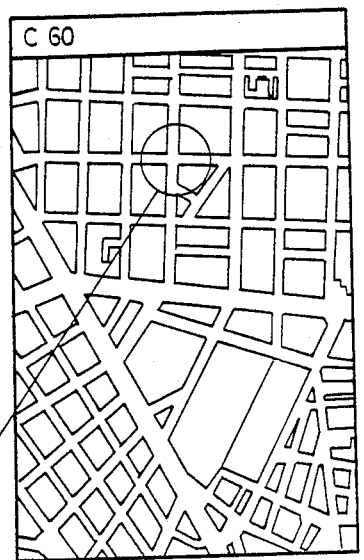
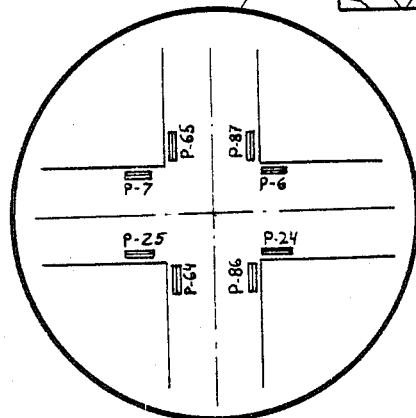
Fig. 6

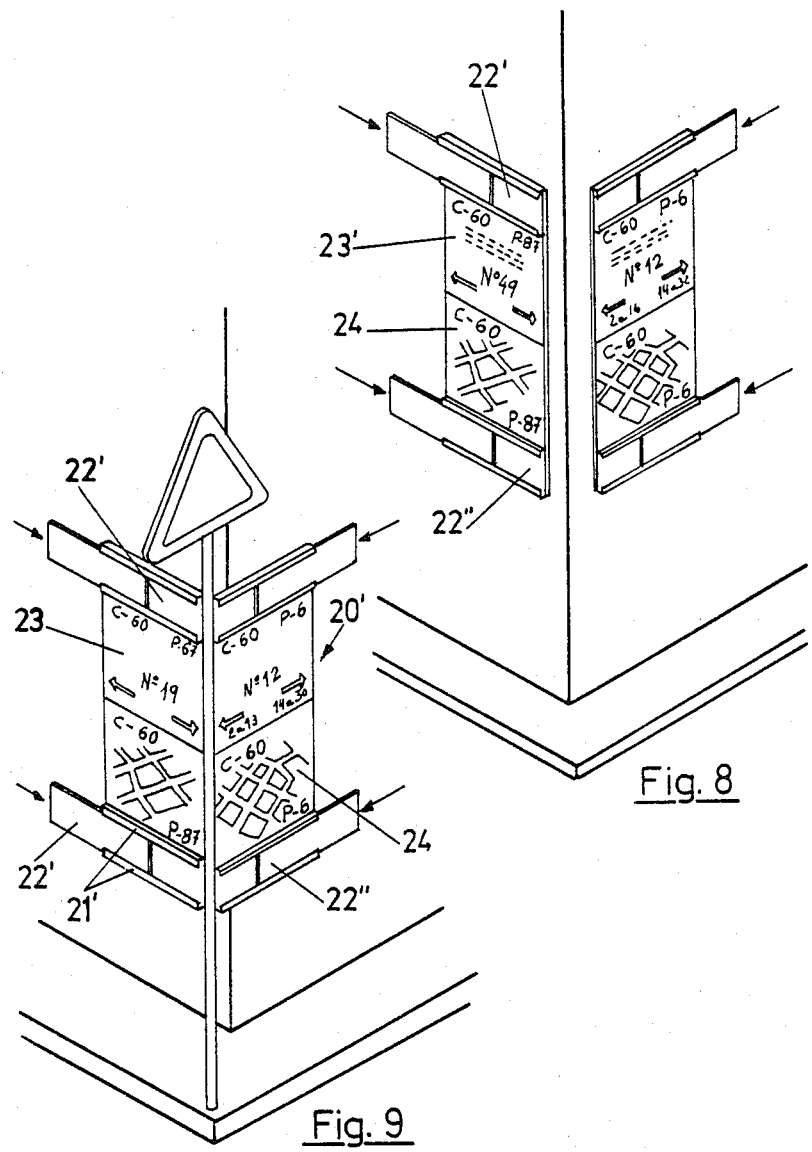

METHOD AND APPARATUS FOR DETERMINING ROUTE FROM A PRESENT LOCATION TO A DESIRED DESTINATION IN A CITY

BACKGROUND OF THE INVENTION

The present invention is directed to a process and apparatus for rapidly and reliably obtaining the coordinates of an address or the location of a building or a street in a city as well as for providing information concerning how to get from a present location to the location of the building or street.

As is well known, it is often difficult to orient oneself in a strange, unknown city, the size of which makes one feel lost upon merely coming into it. Finding and directing oneself to addresses which are known or sought is practically impossible for a new arrival or someone with little knowledge of the city's streets without frequently asking directions from passersby, which is not very desirable.

Using the procedure of the present invention, it is possible to reliably locate any address in the city from any point in the city, whether known or unknown, and, furthermore, by a graphical method which is displayed in very continuous and consecutive form to orient oneself and identify the point sought in a logical and very perceptive manner.

BRIEF DESCRIPTION OF THE INVENTION

The procedure of the present invention divides the city into a plurality of adjacent zones, a separate map being provided for each zone. A traveler wishing to travel to a desired location enters the address of the building at his desired destination into an information station situated at his present location. This information is preferably entered using an alphabetic keyboard which generates a code which is fed to a microprocessor located in the information station. The code is visually verified by the traveler on a digital screen. The microprocessor compares the entered code with information stored on a memory disk which disk contains code information concerning all the streets in the city. As a result of this comparison, the microprocessor determines in which zone the entered address is located. The microprocessor then lights up the corresponding zone on a city map formed on the information station. In this manner, the traveler is informed where the desired zone is located with respect to his present location and also identifies the zone number of the desired zone. The traveler then enters the zone number in a second keyboard which causes a map of the zone to be presented to the traveler. Preferably, a plurality of windows are provided. Once the zone number of the desired zone has been entered by the traveler, the information station causes a map of the desired zone to be advanced to an appropriate window wherein it can be removed by the traveler.

The dispensed maps include both a detailed street map of the zone in question and generalized information on how to get to the zone from the traveler's present location. The generalized information can contain information as to the means of public transportation which pass near the point sought and information regarding possible road routes to the point sought. Signboards are arranged on building walls or on a pole on each street corner throughout the city and provide a reference number corresponding to the zone number of the zone in which the signboard is located. This tells the traveler which zone he is in. Each signboard is preferably given a signboard number which is consecutive with adjacent signboards and, therefore, adjacent street corners. The signboards also indicate the ascending or descending direction of adjacent street addresses and/or signboard numbers.

The zone map contains the gridwork of the streets and corners of the zone. Each intersection will have a minimum of eight signboards along as many directions on the right and left sidewalks of the intersection. Each signboard will be assigned its own number which is consecutive with adjacent signboards on the same side of the same street. The direction of adjacent signboard numbers can also be provided on the signboard, by means of which the route can be followed, searching the descending or ascending numbers until arriving at the point sought.

These boards, which are very visible, may or may not be illuminated. In addition to the foregoing information, they may or may not bear the municipal emblem and any other type of road indication and be provided with one or more general or local advertising spaces. A miniature map of the entire or a portion of the zone may also be included on the signboard. This may be a flat map or may be rolled to let the traveler examine various portions of the zone.

In the presently preferred embodiment, the signboards have two clearly separate zones, an upper one on which the location information (e.g., address, zone number, sign number, etc.) appears and a lower one containing general or local advertising which may even facilitate identification of the coordinate sought by the information on the map. The lower zone preferably takes the form of one or more movable panels which slidingly fit into transverse guides.

In accordance with a variant, the signboards may bear the number of the building to which they are attached or that of the nearest building when they are located on a pole. The board should have at least the code number for the zone and the board number of the board, as well as indications, by means of directional arrows, of the descending and ascending numbering of adjacent blocks, adjacent buildings and/or adjacent signboards. This makes it possible to reach the signboard of the following intersection, which in logical consecutive order, makes it possible to identify at the site the point having the coordinates sought.

In addition to the map of the zone, the information station may issue a general map of the city subdivided into zones, with mention of streets, districts, plazas, etc. in order to provide a more specific overall view and in which there are mentioned the partial indications in order to direct the search towards the specific zone desired, in such a manner that, being oriented by the general map and directed by the partial zone map in conjunction with the signboards which, as stated above, may be provided with a map of the zone they are located in, the traveler may easily find his way to his final destination. As stated above, the boards can be attached to a building or be arranged on a post in order to facilitate visibility, which is greatly imperiled by trees, traffic lights, kiosks and other elevated structures.

BRIEF DESCRIPTION OF THE DRAWINGS

In order to better understand the scope and extent of this invention, we shall describe it in the accompanying drawings and diagrams which show one example, by way of illustration and not of limitation, and in which:

FIG. 1 is a perspective view of the information station in which there are contained the elements adapted to provide the initial programmed data of a theoretical coordinate;

FIG. 2 is a diagram of the elements located in the information station;

FIG. 6 shows a detail of a grid map marked to disclose the actual coordinates sought in the city;

FIG. 8 shows a corner with signboards which is a variant of those shown in FIG. 5, affixed to a building front; and FIG. 9 is a corner post which is used to display a traffic signal or other traffic indication and which also holds the signboards of the present invention.

DETAILED DESCRIPTION OF THE INVENTION

Figures 3, 4:
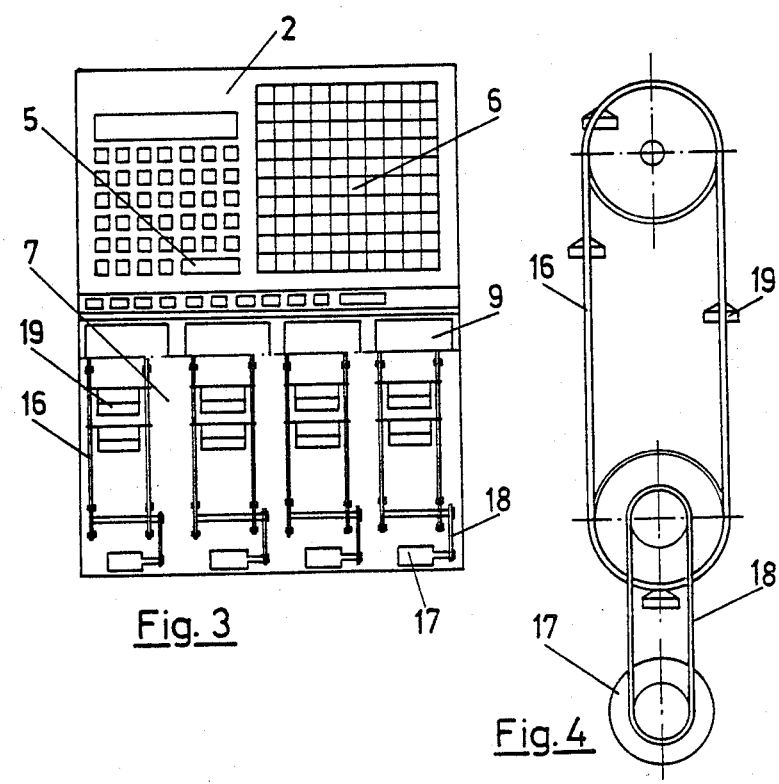
FIG. 3 is a section through the store of maps of the information station having the map-dispensing device, seen from the front and in partial transparent view.
FIG. 4 shows a detail of the dispensing and map-selecting mechanism as response to an input of data by the user.
Figure 5:
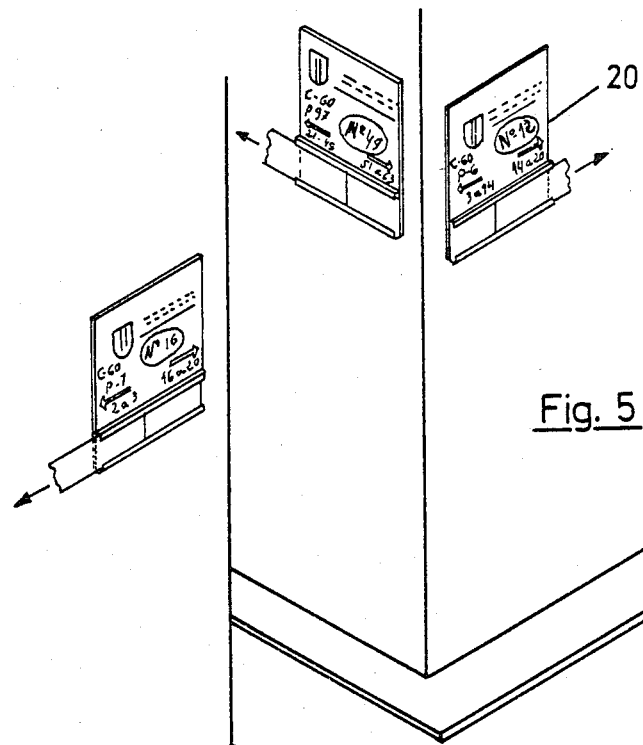
FIG. 5 shows a detail in perspective view of a corner in the city with the signboards, provided with indicating reference.

Referring now to the drawings wherein like numerals indicate like elements, there is shown in FIGS. 1 to 4 an information station constructed in accordance with the principles of the present invention and designated generally as 1. Station 1 includes a cabinet which on its upper part 2 has an alphanumeric keyboard 3 which makes it possible to enter information which is displayed on a small verification screen 4. In case of error, the error may be erased using the erase key 5. The upper part 2 is also provided with a screen 6 which is preferably an entire map of the city divided in a grid work of zones representing subportions of the city. If desired, the screen 6 may just be divided into a number of zones corresponding to the various submaps of the city without containing an overall map of the city on its face. The lower part 7, which takes the form of a desk, is provided with a keyboard 8 and with windows or doors 9.

As can be seen in FIG. 2, the circuit of the information station 1 includes a central processor 10 which is connected to a read-only memory 11, a random-access memory 12, the keyboard 3, a diskette 13 and the map dispenser 14. Each of these elements receives power from a power supply 15.

The read-only memory 11 has stored in it both the data processing program and the program for the management of the keyboard 3, the diskette 13 and the map dispenser 14. The random-access memory 12 has stored in it the data read from the diskette 13 and the memory area of the precessor 10. The diskette 13 is the street-directory memory, that is to say, it contains all streets, plazas, avenues, etc. in the city.

The processor 10 processes the data concerning the desired destination introduced by means of the keybard 3 and the data provided by the diskette 13, and carries out the commands for control of the map dispenser 14 and its keyboard 8.

As shown in FIGS. 3 and 4, the map dispenser includes a series of endless chains 16 moved by a motor 17 via a reducer system 18. The chains support a series of bins 19 which transport the maps.

In order to obtain the theoretical marking map of the route to be followed in order to locate a desired destination point in the city, the processor 10 is provided with information identifying the desired destination by means of the keyboard 3. The processor 10 analyzes the entered information and searches for the desired destination on the diskette 13, finds it and reads the number of the zone which corresponds to the desired destination. The processor 10 then illuminates a corresponding grid of the screen 7, which grid contains a number identifying the key in the keyboard 8 which corresponds to the desired map. This number preferably, though not necessarily, corresponds to the zone number of that zone. When this key is depressed, the map dispenser 14 receives the corresponding signal causing the corresponding chain 16 to be operated until a bin 19 containing the map desired stops in front of the corresponding window 9. At this time, the window 9 is unlocked permitting access to the map.

Figure 7:
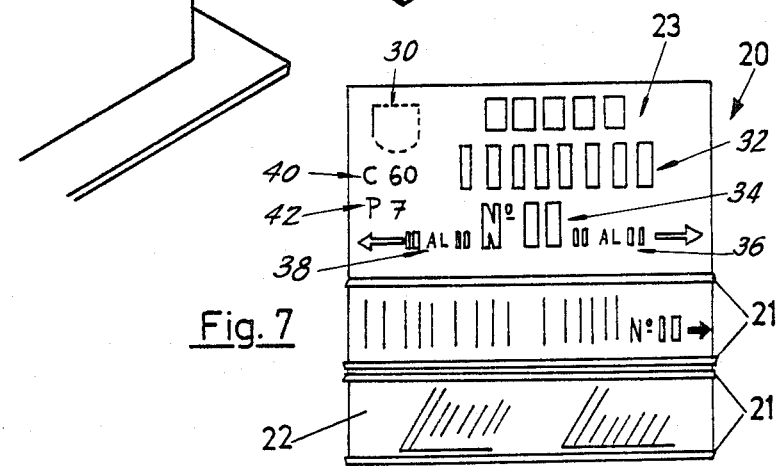
FIG. 7 is a partial detail of a signboard, showing the two regions which are formed by the guides for containing general or local advertisements.

Once the map of the zone in which the desired destination is located has been received, it will provide the traveler with not only the number of the corresponding zone in the city but also information indicating the position and direction of the zone with respect to the traveler's present location, as well as details as to the public transportation available for reaching the zone. Once in the zone, the traveler can find his way to his desired location by viewing the signboards located on the corners of each intersection. These signboards are preferably numbered in consecutive order to enable the traveler to find his destination following the number of these boards. The board 20 (shown in detail in FIG. 7) is divided into two parts, the lower region being provided with pairs of parallel transverse guides 21 facing each other so as to slidably receive boards 22 which fit said guides so that advertising of a general type or of a type evocative of the vicinity around the board itself can be inserted therein, facilitating identification and position, while the upper part 23 is reserved for the sign proper, there being entered in it, for instance, the emblem 30 of the city in which the street is located, the name of the street 32, the number of the building 34 to which it is attached and the numbering in ascending 36 and descending 38 direction of other buildings on the same street. The portion 23 also contains the zone number 40 (e.g. C60) of the zone in which the board is located and a board number 42 (e.g. P7) indicating the number of that board. Preferably, adjacent zones are numbered consecutively. For example, each zone can have a vertical coordinate (a letter) and horizontal coordinate (a numeral) identifying it. Thus, zone C60 is next to zone C59. Similarly, zone C60 is adjacent zone B60. The boards are also numbered consecutively as shown in FIG. 6. The board 20 can contain information (e.g. numbers and arrows) identifying the direction of ascending and descending signboards.

FIGS. 8 and 9 show a variant embodiment of the signboard 20, whether attached to the building front or arranged as banner or standard on a corner pole. This board, designated generally by 20', has two or more advertising areas 22' and 22" with their transverse guides 21' to hold and secure the interchangeable boards 22' which bear special, general or local messages, as well as the region of larger area 23' on which there is set forth information concerning the location of the signboard in question as well as adjacent signboards in accordance with the information on the map dispensed at the information station 1. For example, this information will include numerical data corresponding to the number of the zone and the number of the board 20' (and, therefore, the number of the corner) as well as indications, by directional arrows, of the ascending and descending direction of the numbers of other buildings on this block or entire street, plaza, etc. Alternatively or in addition, this indication can be with reference to adjacent board numbers or adjacent zone numbers. This makes it possible to reach the following intersection signboard 20, which, in consecutive, logical order, makes it possible to identify within the city the point having the coordinates sought. Below this indicating board, there is a plate 24 on which there is shown the actual street grid work of the area with its actual representative number, indication of the place where the traveler is and which even, comparable to the grid map delivered by the information station 1, will have an addendum for a list of streets or a roll-type device with said list in order to facilitate the handling thereof. The information station 1 can deliver a general map of the city, divided into grids in order to facilitate the orientation and direction of the user.

In the preferred embodiment, the minimum number of signboards 20 used at each intersection must be eight so that the indication and signaling are completely covered, not only on each portion of block but over all of each street, it being possible to easily locate oneself when arriving at an intersection and to proceed without the slightest doubt in the correct direction without interfering with or disturbing the flow of traffic, and even investigating the position of the establishment whose advertisement is contained on the signboards in question.

Based on these elements, the simplicity with which addresses can be found will be easily understood, even if one has not the slightest knowledge of the city in which one is, since by merely spelling out the name of the street and the number sought, and verifying that it has been typed properly, the traveller obtains a visual display of the position of the desired destination with reference to the present location and the zone number assigned to the zone of the desired destination. By entering the number into a second keyboard (one keyboard may be used if desired), a map is dispersed providing information on how to get to the desired destination. This information, together with the information on the signboards, make it possible for the traveler to easily reach his destination.

The present invention may be embodied in other specific forms without departing from the spirit or essential attributes thereof and, accordingly, reference should be made to the appended claims, rather than to the foregoing specification, as indicating the scope of the invention.

What is claimed is:

1. A method for determining a proper route from a present location to a desired destination, said method comprising the steps of:
   storing information in a memory, said information identifying all the addresses of a city and zone number to each said address, each zone number defining a zone including a plurality of adjacent addresses;
   entering the address of a desired location into a processor by a human input device;
   comparing in said processor the entered adress with said stored information and providing a map of the zone in which said entered address is located; and
   proceeding to said desired location in accordance with information contained on said map and information contained on signboards located at each corner of the city and each of said signboards indicating the direction of adjacent signboards.

2. The method of claim 1, wherein each of said signboards is assigned a signboard number unique thereto, and wherein each of said signboards contains information concerning the number of adjacent signboards in both ascending and descending directions.

3. A method for determining a proper route from a present location to a desired destination, said method comprising the steps of:
   storing information in a memory, said information identifying all of the addresses of a city and assigning a zone number to each said address, each zone number being assigned to a plurality of adjacent addresses;
   entering the address of a desired location into a processor by a human actuable input device;
   comparing in said processor, the entered address with said stored information and providing a visual indication of the zone number in which said entered address is located;
   providing a map of an area of said city which corresponds to said zone number in response to the entry of said zone number by a human actuable device;
   proceeding to said desired location in accordance with the information contained on said map and information contained on signboards located at each corner of the city, each of said signboards indicating the direction of adjacent signboards.

4. An information station, comprising:
   first means for enabling an individual to identify the address of a desired destination, said first means including a keyboard for entering said address, a verification screen for verifying the entered address and erase means for erasing improperly entered addresses;
   a read-only memory storing information which identifies all of the addresses of a city and assigns a zone number, to each said address, each zone number defining a zone including a plurality of adjacent addresses;
   second means for comparing said entered address with said stored information and for displaying a number of corresponding to the zone in which said entered address is located as a function of said comparison;
   human actuable means enabling a traveler to enter the zone number of the zone identified by said second means; and
   third means for providing a map of the zone corresponding to the zone number entered.

5. The information station of claim 4, further including a city map of the entire city divided into adjacent zones, and wherein said second means displays a number of corresponding to the zone in which said entered address is located by highlighting the corresponding zone on said city map.

6. The information station of claim 4, wherein said human actuable means is a second keyboard.

7. The information station of claim 4, wherein said third means comprises a plurality of bins, each bin containing at least one map of a given zone and means for advancing the bin of a map of the zone entered by said human actuable means to an area where said traveler may remove said map.

8. The information station of claim 7, wherein said area includes a window which is unlocked when a bin containing a map of the zone entered by said human actuable means has been moved adjacent said window.

9. The information of claim 4, wherein said third means comprises:
a plurality of trapdoors;
a plurality of map holders equal in number to the number of trapdoors, each map holder including a plurality of bins and being capable of moving said bins, one at a time, to a position adjacent its associated trapdoor, and means for causing the bin containing a map of the zone entered by said human actuable means to a position adjacent its associated trapdoor in reponse to the entry of said zone number by said human actuable means.

10. The information station of claim 9, further including means for unlocking said trapdoor when a bin containing a map corresponding to said zone number entered by said human actuable means has reached its associated said trapdoor.

11. An information station according to claim 4, wherein said map includes a street map of said zone corresponding to the zone number entered by said human actuable means as well as information concerning possible routes from the location of said information station to said zone.

12. The combination of the information station of claim 11 plus a plurality of signboards, each signboard being located at a different corner of said city, each signboard including information identifying the zone in which said signboard is located and a signboard number unique to said signboard.

13. The combination of claim 12, wherein each of said signboards are consecutively numbered in accordance with the street on which they are located and wherein said signboards further include information concerning the ascending and descending directions of adjacent signboards.

14. The combination of claim 12, wherein said signboards are provided with transverse guides which permit the sliding of cards or advertising into and out of the guides.

* * * * *